(12) United States Patent
Scommegna et al.

(10) Patent No.: US 11,083,543 B2
(45) Date of Patent: Aug. 10, 2021

(54) FAN SCREW FOR THE EXPANSION OF THE UPPER JAW

(71) Applicant: LEONE S.p.a., Sesto Fiorentino (IT)

(72) Inventors: Gabriele Scommegna, Tavarnuzze Impruneta (IT); Maurizio Dolfi, Florence (IT)

(73) Assignee: LEONE S.P.A., SESTO FIORENTINO (IT)

( * ) Notice: Subject to any disclaimer, the term of this patent is extended or adjusted under 35 U.S.C. 154(b) by 0 days.

(21) Appl. No.: 15/560,759

(22) PCT Filed: Mar. 23, 2016

(86) PCT No.: PCT/IT2016/000071
§ 371 (c)(1),
(2) Date: Sep. 22, 2017

(87) PCT Pub. No.: WO2016/157228
PCT Pub. Date: Oct. 6, 2016

(65) Prior Publication Data
US 2018/0078340 A1     Mar. 22, 2018

(30) Foreign Application Priority Data
Mar. 30, 2015 (IT) .............................. FI2015A000093

(51) Int. Cl.
*A61C 7/10* (2006.01)
*A61C 7/02* (2006.01)
*A61C 7/14* (2006.01)

(52) U.S. Cl.
CPC .................. *A61C 7/10* (2013.01); *A61C 7/02* (2013.01); *A61C 7/14* (2013.01)

(58) Field of Classification Search
CPC .................................... A61C 7/10; A61C 7/08
See application file for complete search history.

(56) References Cited

U.S. PATENT DOCUMENTS 4,348,179 A * 9/1982 Nardella ................... A61C 7/10
433/7
4,379,693 A * 4/1983 Wallshein ................ A61C 7/10
433/7
4,482,318 A * 11/1984 Forster ..................... A61C 7/10
433/7

(Continued)

FOREIGN PATENT DOCUMENTS

DE      27 22 515 A1    11/1978
DE     199 45 444 A1     4/2001
EP       0 846 446 A1     6/1998

*Primary Examiner* — Yogesh P Patel
(74) *Attorney, Agent, or Firm* — McGlew and Tuttle, P.C.

(57) ABSTRACT

A fan screw for the expansion of the upper jaw, including two bodies (1, 2) connected by at least one driving screw (4; 7) and placed on opposite sides with respect to a sagittal plane (x-x), the longitudinal axis (v-v; k-k) of the at least one expansion screw (4; 7) being perpendicular to the plane (x-x), each of the bodies (1, 2) having a lingual side (L1, L2) and an opposite upper side and being provided with a structure for anchoring it to several teeth of a dental arch destined to be expanded. The longitudinal axis (v-v; k-k) of the at least one driving screw (4; 7) is at a predetermined distance (h) from the lingual sides (L1, L2) of bodies (1, 2), the distance (h) being measured along a lingual direction (L) parallel to the plane (x-x), such that the distance between the axis (v-v) of the at least one driving screw (4; 7) and the upper sides of bodies (1, 2) is greater than the distance between the upper and the lower sides of bodies (1, 2).

22 Claims, 5 Drawing Sheets

(56) References Cited

U.S. PATENT DOCUMENTS

| | | | | |
|---|---|---|---|---|
| 5,645,422 | A * | 7/1997 | Williams | A61C 7/10 433/7 |
| 5,775,898 | A * | 7/1998 | Schellino | A61C 7/10 433/7 |
| 5,975,894 | A * | 11/1999 | Pozzi | A61C 7/10 433/7 |
| 6,109,916 | A * | 8/2000 | Wilcko | A61C 7/10 433/24 |
| 6,213,766 | B1 * | 4/2001 | Di Massa | A61C 7/10 433/7 |
| 6,241,517 | B1 * | 6/2001 | Williams | A61C 7/10 433/19 |
| 6,299,439 | B1 * | 10/2001 | Kooiman | A61C 7/10 433/7 |
| 6,334,771 | B1 * | 1/2002 | Liou | A61C 7/10 433/19 |
| 2002/0142259 | A1 * | 10/2002 | Ceppatelli | A61C 7/10 433/7 |
| 2004/0214126 | A1 * | 10/2004 | Forster | A61C 7/10 433/7 |
| 2007/0218416 | A1 * | 9/2007 | Keles | A61C 7/10 433/7 |
| 2007/0275341 | A1 * | 11/2007 | Hanks | A61C 7/10 433/7 |
| 2008/0171300 | A1 * | 7/2008 | Forster | A61C 7/10 433/7 |
| 2013/0252195 | A1 * | 9/2013 | Popat | A61C 7/10 433/24 |
| 2016/0270883 | A1 * | 9/2016 | Yousefian | A61C 7/10 |
| 2017/0290643 | A1 * | 10/2017 | Giardino | A61C 7/10 |
| 2018/0311014 | A1 * | 11/2018 | Yousefian | A61C 8/0096 |

\* cited by examiner

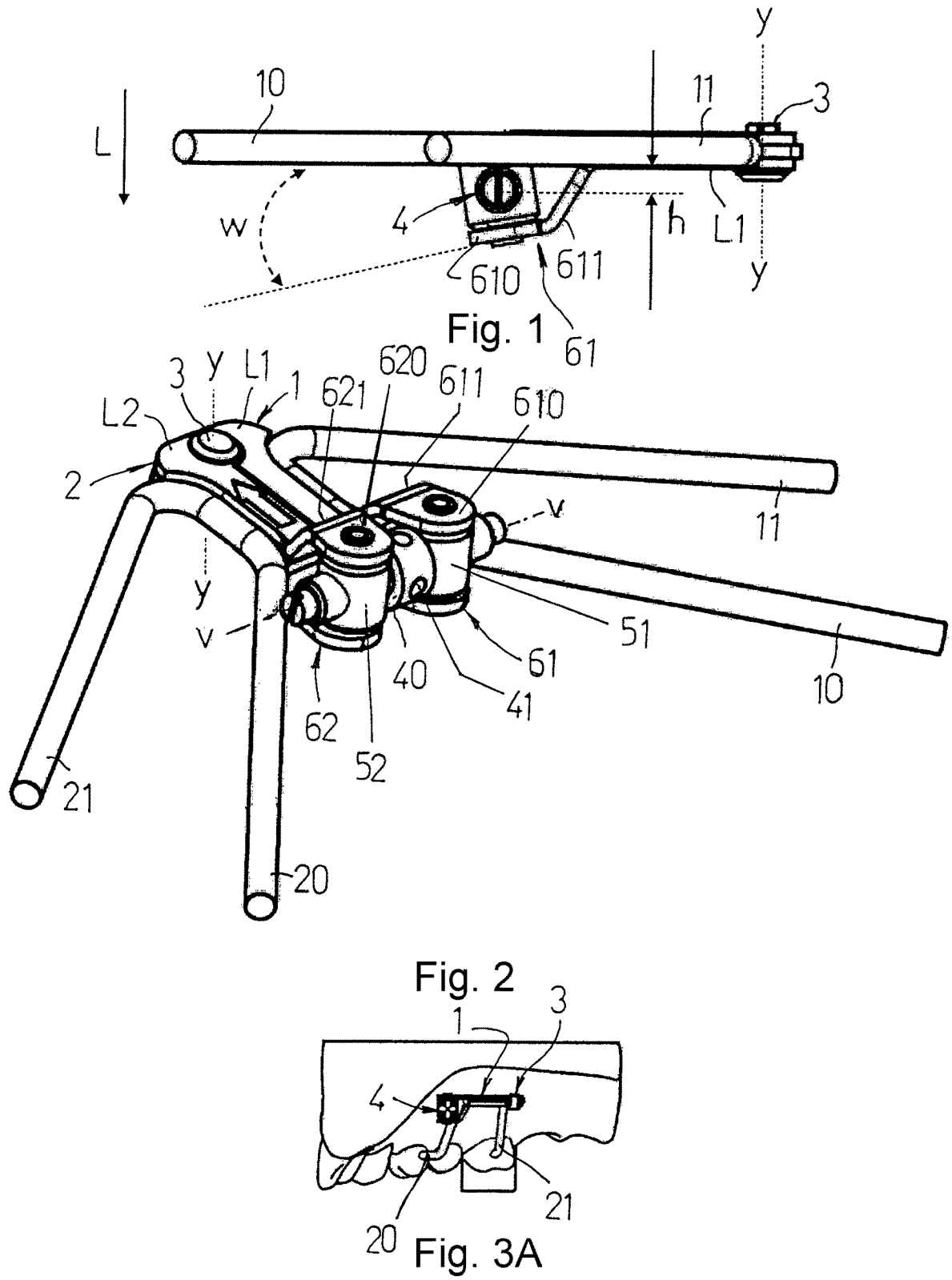

FAN SCREW FOR THE EXPANSION OF THE UPPER JAW

CROSS REFERENCE TO RELATED APPLICATIONS

This application is a United States National Phase Application of International Application PCT/IT2016/000071, filed Mar. 23, 2016, and claims the benefit of priority under 35 U.S.C. § 119 of Italian Application FI2015A000093, filed Mar. 30, 2015, the entire contents of which are incorporated herein by reference.

TECHNICAL FIELD

The present invention relates to a fan screw for the expansion of the upper jaw.

More particularly, a screw in accordance with the present invention is of the type usable for expanders capable of exerting expanding forces forming in the front area of the dental arch of the upper jaw for the treatment of the front transverse deficiency also associated with second-class or skeletal malocclusions.

BACKGROUND

EP 846 446 discloses a fan screw of the type mentioned above, comprising two symmetrical bodies provided with arms on which can be welded orthodontic bands to allow the anchoring thereof to a predetermined number of upper teeth. Said bodies are hinged with each other by a hinge and between them there is an expansion screw, so that the bodies can be made to rotate about the axis of said hinge by acting on a driving portion of the expansion screw, thus causing the angular spreading apart of the two bodies that therefore, through the arms anchored to the teeth, provoke the required expansion.

SUMMARY OF THE INVENTION

The main purpose of the present invention is to allow easier use of fan screws for the expansion of the upper jaw.

This result is achieved, according to the present invention, by providing a fan screw having the features according to the present invention.

Thanks to the present invention, the operation of the expansion screw is easier, which results in benefits for both the patient and the physician in the execution phase of the treatment. Furthermore, a screw in accordance with the present invention is relatively simple and economical to manufacture in relation to the advantages offered.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of a fan expansion screw in accordance with the present invention;

FIG. 2 is a schematic perspective view of the lingual side of a fan expansion screw in accordance with the present invention;

FIG. 3A is a schematic side view of a fan expansion screw in accordance with the present invention in the use configuration;

DESCRIPTION OF PREFERRED EMBODIMENTS

Figure 3B:
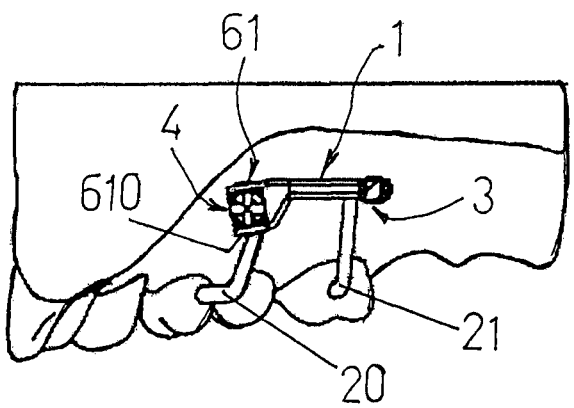
FIG. 3B is a schematic side view of a fan expansion screw in accordance with the present invention in the use configuration.

Reduced to its essential structure and with reference to FIGS. 1-5 of the accompanying drawings, a fan screw in accordance with the present invention comprises two flat bodies (1, 2) each of which is provided with two side arms (10, 11; 20, 21). The bodies (1, 2) are connected with each other by a rear hinge (3) and are symmetrical with respect to a sagittal plane (x-x) in which lies the axis (y-y) of the hinge (3). The side arms (10, 11; 20, 21) are oriented with a predetermined angle with respect to the sagittal plane (x-x) and form a pair of front arms (10, 20) and a pair of rear arms (11, 21). The distal end of each arm (10, 11, 20, 21) is welded to an orthodontic band (100, 110, 200, 210) to allow the anchoring thereof to selected teeth of the dental arch under treatment. While the rear parts of the bodies (1, 2) are connected by the hinge (3), the front parts of the same bodies (1, 2) are connected by a driving screw (4) which has a central driving portion (40) with radial holes (41) to allow the insertion of a suitable tool by means of which the screw (4) is rotated about its own axis (v-v) which is orthogonal to the sagittal plane (x-x). The screw (4) has two opposing threaded sterns, each of which is engaged in a corresponding thread nut provided by a respective bush (51; 52). Each of the two bushings (51, 52) is fixed to the front part of a corresponding body (1, 2) by means of "C"-shaped brackets (61, 62) projecting from the front part of bodies (1) and (2). By rotating the driving screw (4) about its axis (v-v), the bodies (1, 2) rotate around the axis of the hinge (3) and, as a consequence, the divarication the bodies (1, 2) is adjusted as decided by the doctor.

Figure 3C:
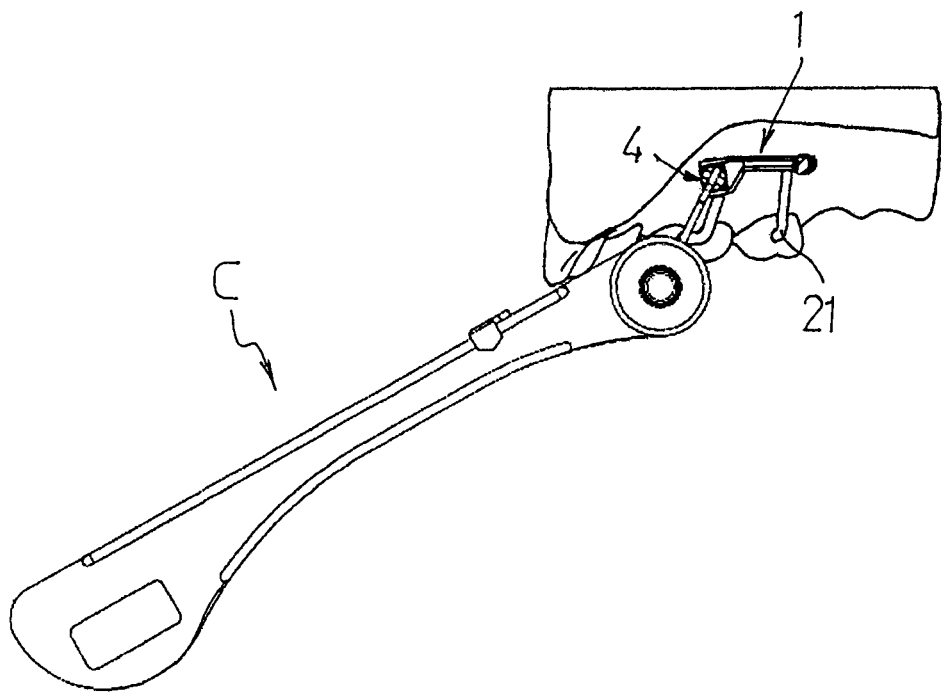
FIG. 3C is a schematic side view of a fan expansion screw in accordance with the present invention in the use configuration.
Figure 4:
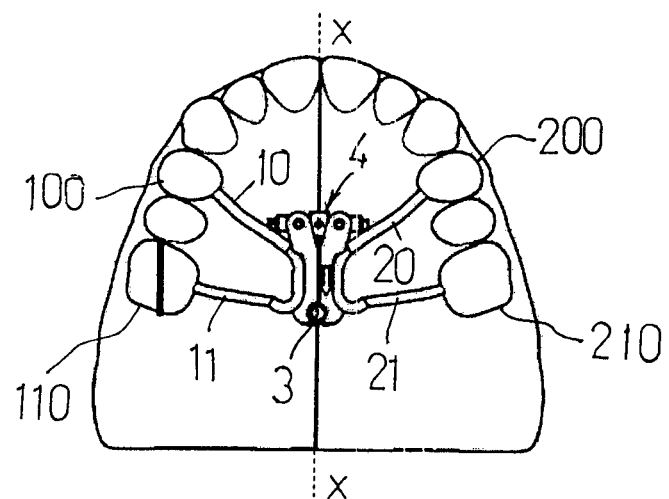
FIG. 4 is a schematic plan view of the lingual side of the screw shown in FIGS. 3A-3C in a use condition.
Figure 5:
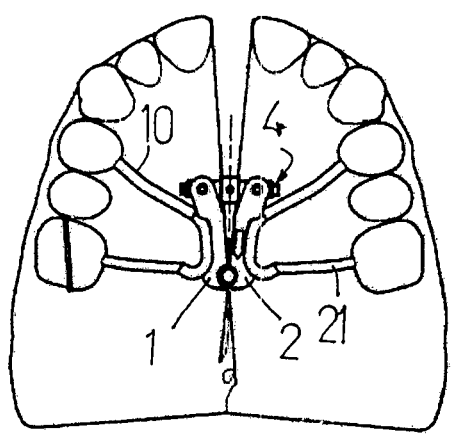
FIG. 5 is a schematic plan view of the lingual side of the screw shown in FIGS. 3A-3C in a different use condition.
Figure 6:
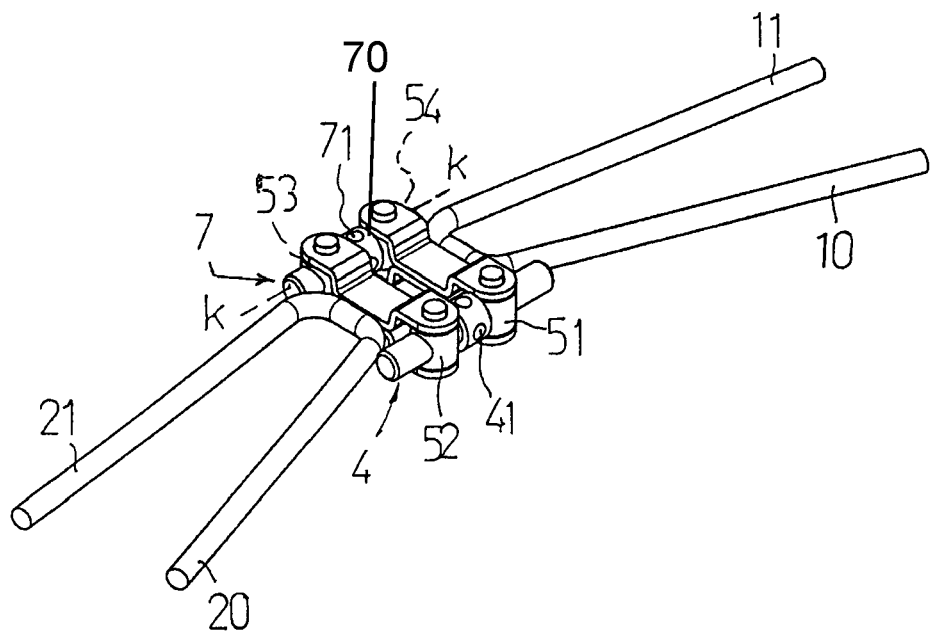
FIG. 6 is a view of a further embodiment of a fan expansion screw in accordance with the present invention.
Figure 7:
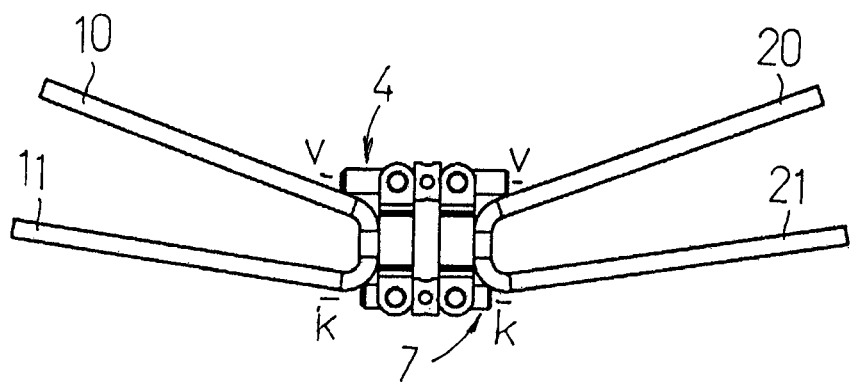
FIG. 7 is a view of the further embodiment of the fan expansion screw in accordance with the present invention.
Figure 8:
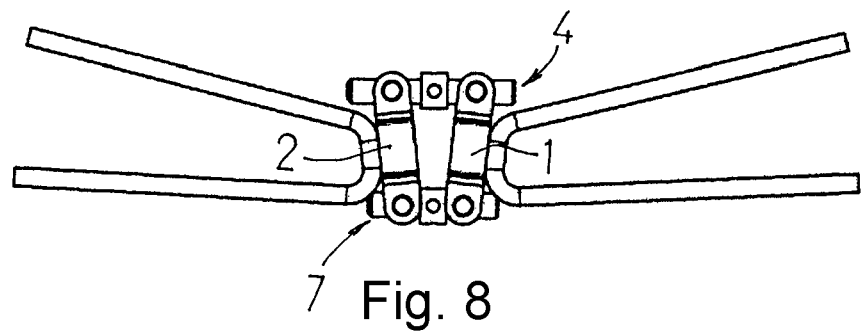
FIG. 8 is a view of the further embodiment of the fan expansion screw in accordance with the present invention.
Figure 9:
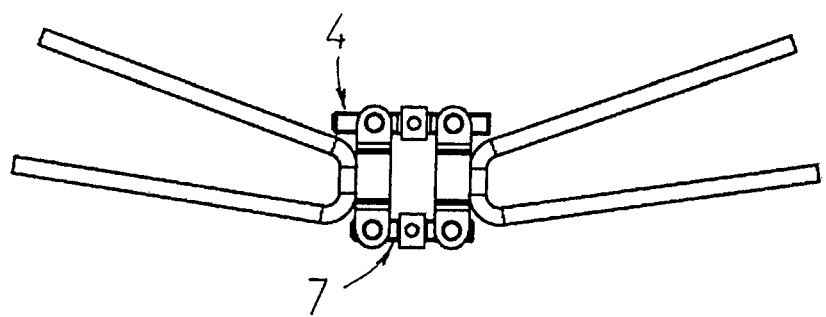
FIG. 9 is a view of the further embodiment of the fan expansion screw in accordance with the present invention.
Figure 10:
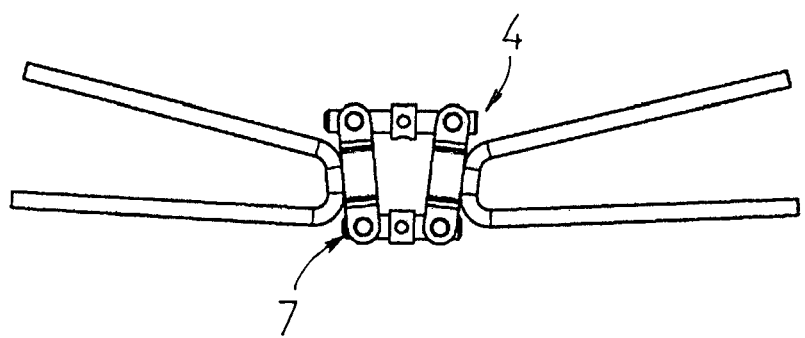
FIG. 10 is a view of the further embodiment of the fan expansion screw in accordance with the present invention.

Advantageously, the axis (v-v) of the screw (4) is spaced by a predetermined value (h) from the lingual side (L1, L2) of the bodies (1, 2), the value (h) being measured in a lingual direction (L) parallel to the aforementioned sagittal plane (x-x), i.e. parallel to the axis (y-y) of the hinge (3). In practice, by spacing the axis (v-v) of the driving screw (4) from the lingual side of bodies (1) and (2), the maneuvering portion (40) of the driving screw (4) is in a more easily accessible position that facilitates the activation of the device. In other words, the axis (v-v) of the driving screw (4)

is lowered compared to conventional devices, ie, without modifying the position of the bodies (1, 2) with respect to the palate, the driving screw (4) is more spaced from the palate and its driving portion (40) is in a more easily accessible location allowing an easier use of a tool (C) of the type normally used for rotating the screw, as shown in FIG. 3C. Yet in other words, said axis (v-v) is located below the lingual sides (L1, L2) of bodies (1, 2) when the expansion fan screw according to the present invention is in the use position. As shown in the drawings, in the use position, the present expansion fan screw has an upper or palatal side turned towards the patient's palate and a lower or lingual side turned towards the patient's tongue. Similarly, said bodies (1, 2) have an upper or palatal side and an opposite lingual side (L1, L2) turned towards the patient's tongue when the expansion fan screw is in use. The distance between the axis (v-v) of the driving screw (4) and the upper sides of bodies (1, 2) is greater than the distance between the upper and the lower sides of bodies (1, 2). This result can be obtained, for example, by making the brackets (61, 62) in such a manner that a wing (610, 620) of each bracket (61, 62), which is bound to a base portion of the respective bush (51, 52), is spaced from the lingual side (L1, L2) of the respective body (1, 2). Said wing (610, 620) is connected to the lingual (L1, L2) of the respective body (1, 2) by means of a suitably bend (611, 621) rear extension. Preferably, said wing (610, 620) is inclined in a lingual direction by a predetermined angle (w), for example by 10°, relative to the lingual side (L1, L2) of the respective body (1, 2). The angle (w) is represented in FIG. 1 where one wing (610) only is visible because this is a side view. In practice, said wings (610, 620) form support surfaces for the driving screw (4) inclined with respect to the lingual sides of bodies (1, 2) so as to further facilitating the use of the tool (C). For example, the value (h) is between 1 and 2 rom and preferably between 1.5 and 1.6 mm.

With reference to the example shown in FIGS. 6-10, the aforementioned hinge (3) is replaced by a second driving screw (7), such that the bodies (1, 2) are joined by two driving screws (4, 7) on both their front and rear sides. The second driving screw (7) is also provided with a central maneuvering part (70) with radial holes (71) similar to those exhibited by the first driving screw (4). The screws (4) and (7) are parallel to one another, i.e. oriented with the respective axes (v-v, k-k) perpendicular to said plane (x-x). This allows to adjust the opening of the device on the front side and the rear separately as illustrated, in particular, in FIGS. 8-10. Similarly to the previous case, the longitudinal axes (v-v, k-k) of screws (4, 7) are spaced by a predetermined value (h) from the lingual side of bodies (1, 2). And, as previously described, the screws (4, 7) are inserted with the respective threaded parts in threadened bushes (51, 52; 53, 54) fixed to the bodies (1, 2) by means of shaped brackets that hold the screws (4, 7) spaced from the lingual side of the bodies (1, 2). Preferably, as previously described, said driving screws (4, 7) are supported by surfaces inclined by a predetermined angle (w) with respect to the lingual sides of bodies (1, 2).

From the foregoing description it is apparent that a fan screw for the expansion of the upper jaw in accordance with the invention, in practice, comprises two bodies (1, 2) interconnected by at least one driving screw (4; 7) and placed on opposite sides with respect to a sagittal plane (x-x), the longitudinal axis (v-v; k-k) of said at least one driving screw (4; 7) being orthogonal to said plane (x-x), each of said bodies (1, 2) exhibiting a lingual side (L1, L2) and an opposite upper side, the longitudinal axis (v-v; k-k) of said at least one driving screw (4; 7) being at a predetermined distance (h) from the lingual sides (L1, L2) of said bodies (1, 2), said distance (h) being measured in a lingual direction (L) parallel to said plane (x-x) such that the distance between the axis (v-v) of the at least one driving screw (4; 7) and the upper sides of bodies (1, 2) is greater than the distance between the upper and the lower sides of bodies (1, 2).

The components of the screw in accordance with the present invention can be made with biocompatible materials of the type normally used for the production of intraoral devices.

In practice the details of execution may vary in any equivalent way as for what concerns the individual elements described and illustrated without thereby departing from the scope of the adopted solution and thus remaining within the limits of the protection conferred by the present patent.

While specific embodiments of the invention have been shown and described in detail to illustrate the application of the principles of the invention, it will be understood that the invention may be embodied otherwise without departing from such principles.

The invention claimed is:

1. A fan screw for expansion of an upper jaw, the fan screw comprising:
   two bodies connected by one driving screw and placed on opposite sides with respect to a sagittal plane;
   said bodies having a front side and a back side, wherein a longitudinal axis of said driving screw is perpendicular to said sagittal plane;
   each of said bodies having a lingual side and an opposite upper side and being provided with means for anchoring to several teeth of a dental arch destined to be expanded;
   said longitudinal axis of said driving screw being at a predetermined distance from the lingual sides of said bodies; said predetermined distance being measured along a lingual direction parallel to said sagittal plane, such that the distance between the longitudinal axis of the driving screw and the upper sides of said bodies is greater than the distance between the upper and the lower sides of said bodies;
   said driving screw connecting said front sides of said bodies, said back sides of said bodies being connected with each other via a hinge having a hinge axis parallel to said sagittal plane;
   wherein a bushing is fixed to a front part of each of said two bodies by C-shaped brackets projecting from said front part of said two bodies such that by rotating said driving screw about said longitudinal axis, said bodies rotate around said hinge and a divarication of said two bodies is adjusted;
   each of said C-shaped brackets having a wing bound to a base portion of a respective bushing and said wing is spaced from said lingual side of a respective body, said wing being connected to said lingual side of said respective body by a bend rear extension.

2. A fan screw according to claim 1, wherein said predetermined distance is between 1 and 2 mm, the upper sides of said bodies being located at a distance from the lower sides of said bodies in an area of said bodies, at least a portion of said area of said bodies being adjacent to said hinge.

3. A fan screw according to claim 1, wherein said anchoring means comprises a plurality of orthodontic bands arranged on corresponding arms projecting laterally from said bodies.

4. A fan screw according to claim 1, wherein said driving screw is supported on a surface inclined by a predetermined angle in a lingual direction relative to the lingual side of the bodies.

5. A fan screw according to claim 4, wherein said angle has a value of 10°.

6. A fan screw according to claim 1, wherein said predetermined distance is between 1.5 and 1.6 mm.

7. The fan screw for expansion of an upper jaw of claim 1, wherein said wing is inclined in a lingual direction by an angle of 10°, relative to the lingual side of the respective body.

8. The fan screw for expansion of an upper jaw of claim 1, wherein said means for anchoring to several teeth of a dental arch destined to be expanded comprises orthodontic bands.

9. A fan screw for expansion of an upper jaw, the fan screw comprising:
   a first bushing;
   a driving screw comprising a driving screw longitudinal axis;
   a first body comprising a first body front side, a first body back side, a first body upper side, a first body lower side and a first body lingual side, said first body lingual side being located opposite said first body upper side, wherein said first bushing is fixed to said first body front side by a first C-shaped bracket projecting from said first body front side, said first C-shaped bracket having a first wing fixed to a first base portion of said first bushing, said first wing being spaced from said first body lingual side of said first body, said first wing being connected to said first body lingual side of via a first bent rear extension of said first body;
   a second bushing; and
   a second body comprising a second body front side, a second body back side, a second body upper side, a second body lower side and a second body lingual side, said second body lingual side being located opposite said second body upper side, said first body being connected to said second body via said driving screw, said first body and said second body being located on opposite side with respect to a sagittal plane, said driving screw longitudinal axis being perpendicular to said sagittal plane, said driving screw longitudinal axis being located at a predetermined distance from said first body lingual side and said second body lingual side with respect to a lingual direction parallel to said sagittal plane, said driving screw longitudinal axis being located at another distance from said first body upper side and said second body upper side, said first body upper side being located at a first distance from said first body lower side, said second body upper side being located at a second distance from said second body lower side, said another distance being greater than each of said first distance and said second distance, said driving screw connecting said first body front side and said second body front side, said first body back side and said second body back side being connected via a hinge having an axis parallel to said sagittal plane, wherein said second bushing is fixed to said second body front side by a second C-shaped bracket projecting from said second body front side, said second C-shaped bracket having a second wing fixed to a second base portion of said second bushing, said second wing being spaced from said second body lingual side of said second body, said second wing being connected to said second body lingual side of via a second bent rear extension of said first body.

10. A fan screw according to claim 9, wherein said predetermined distance is between 1 and 2 mm, said first body upper side being located at said first distance from said first body lower side in a first body area of said first body, at least a portion of said first body area being located between said hinge and said first bent rear extension, said second body upper side being located at said second distance from said second body lower side in a second body area of said second body, at least a portion of said second body area being located between said hinge and said second bent rear extension.

11. A fan screw according to claim 9, wherein each of said first body and said second body comprises a plurality of orthodontic bands arranged on corresponding arms projecting laterally from a respective body, said first body upper side being located at said first distance from said first body lower side in a first body area of said first body, at least a portion of first body area being located adjacent to said hinge, said second body upper side being located at said second distance from said second body lower side in a second body area of said second body, at least a portion of said second body area being located adjacent to said hinge.

12. A fan screw according to claim 9, wherein said driving screw is supported on a surface inclined by a predetermined angle in a lingual direction relative to said first body lingual side and said second body lingual side, said first wing being located at a downward position from said first body lingual side, said second wing being located at another downward position from said second body lingual side.

13. A fan screw according to claim 12, wherein said angle has a value of 10°.

14. A fan screw according to claim 9, wherein said predetermined distance is between 1.5 and 1.6 mm.

15. A fan screw according to claim 9, wherein said first body comprises a first body wing, a first body bent portion and a first body portion, said first body bent portion being located between said first body portion and said first body wing, said first body wing being located below a lingual side surface of said first body portion and said driving screw longitudinal axis, said first body wing supporting at least a portion of said driving screw, said second body comprising a second body wing, a second body bent portion and a second body portion, said second body bent portion being located between said second body portion and said second body wing, said second body wing being located below a lingual side surface of said second body and said driving screw longitudinal axis, said second body wing supporting at least a portion of said driving screw, said first body wing and said second body wing being located at a position below said hinge.

16. A fan screw for expansion of an upper jaw, the fan screw comprising:
   a driving screw comprising a driving screw longitudinal axis;
   a first bushing;
   a first body comprising a first body front side, a first body back side, a first body upper side, a first body lower side and a first body lingual side, said first body lingual side being located opposite said first body upper side, wherein said first bushing is fixed to said first body front side by a first C-shaped bracket projecting from said first body front side, said first C-shaped bracket having a first wing fixed to a first base portion of said first bushing, said first wing being spaced from said first body lingual side of said first body, said first wing being connected to said first body lingual side of via a first bent rear extension of said first body, said first bent rear extension of said first body extending in a direction away from said first body lingual side, wherein said first wing is offset from said first body lingual side;

a second bushing; and a second body comprising a second body front side, a second body back side, a second body upper side, a second body lower side and a second body lingual side, said second body lingual side being located opposite said second body upper side, said first body being connected to said second body via said driving screw, said first body and said second body being located on opposite side with respect to a sagittal plane, said driving screw longitudinal axis being perpendicular to said sagittal plane, said driving screw longitudinal axis being located at a predetermined distance from said first body lingual side and said second body lingual side with respect to a lingual direction parallel to said sagittal plane, wherein said driving screw longitudinal axis is located below said first body lingual side and said second body lingual side, said driving screw longitudinal axis being located at another distance from said first body upper side and said second body upper side, said first body upper side being located at a first distance from said first body lower side, said second body upper side being located at a second distance from said second body lower side, said another distance being greater than each of said first distance and said second distance, said driving screw connecting said first body front side and said second body front side, said first body back side and said second body back side being connected via a hinge having an axis parallel to said sagittal plane, wherein said second bushing is fixed to said second body front side by a second C-shaped bracket projecting from said second body front side, said second C-shaped bracket having a second wing fixed to a second base portion of said second bushing, said second wing being spaced from said second body lingual side of said second body, said second wing being connected to said second body lingual side of via a second bent rear extension of said first body, said second bent rear extension of said second body extending in a direction away from said second body lingual side, wherein said second wing is offset from said first body lingual side.

17. A fan screw according to claim 16, wherein said predetermined distance is between 1 and 2 mm, said first wing being offset in a downward direction from said first body lingual side, said second wing being offset in a downward direction from said first body lingual side.

18. A fan screw according to claim 16, wherein each of said first body and said second body comprises a plurality of orthodontic bands arranged on corresponding arms projecting laterally from a respective body, said first body upper side being located at said first distance from said first body lower side in a first body area of said first body, at least a portion of first body area being located adjacent to said hinge, said second body upper side being located at said second distance from said second body lower side in a second body area of said second body, at least a portion of said second body area being located adjacent to said hinge.

19. A fan screw according to claim 16, wherein said driving screw is supported on a surface inclined by a predetermined angle in a lingual direction relative to said first body lingual side and said second body lingual side.

20. A fan screw according to claim 19, wherein said angle has a value of 10°.

21. A fan screw according to claim 16, wherein said predetermined distance is between 1.5 and 1.6 mm, said first body upper side being located at said first distance from said first body lower side in a first body area of said first body, at least a portion of said first body area being located between said hinge and said first bent rear extension, said second body upper side being located at said second distance from said second body lower side in a second body area of said second body, at least a portion of said second body area being located between said hinge and said second bent rear extension.

22. A fan screw according to claim 16, wherein said first body comprises a first body wing, a first body bent portion and a first body portion, said first body bent portion being located between said first body portion and said first body wing, said first body wing being located below a lingual side surface of said first body portion and said driving screw longitudinal axis, said first body wing supporting at least a portion of said driving screw, said second body comprising a second body wing, a second body bent portion and a second body portion, said second body bent portion being located between said second body portion and said second body wing, said second body wing being located below a lingual side surface of said second body and said driving screw longitudinal axis, said second body wing supporting at least a portion of said driving screw, said first body wing and said second body wing being located at a position below said hinge.

* * * * *